United States Patent [19]

Korenblit

[11] Patent Number: 4,973,063
[45] Date of Patent: Nov. 27, 1990

[54] TANDEM MOUNTED FACE SEALS
[75] Inventor: Izya Korenblit, Cincinnati, Ohio
[73] Assignee: ITT Corporation, New York, N.Y.
[21] Appl. No.: 380,164
[22] Filed: Jul. 14, 1989
[51] Int. Cl.$^5$ ............................................. F16J 15/32
[52] U.S. Cl. ..................................... 277/57; 277/58; 277/68; 277/95
[58] Field of Search ................. 277/95, 28, 58, 68, 277/133, 25, 65, 57; 417/423.11

[56] References Cited

U.S. PATENT DOCUMENTS

| | | | |
|---|---|---|---|
| 3,015,505 | 1/1962 | Smith | 277/65 |
| 3,504,917 | 4/1970 | Malmstrom | 277/25 |
| 3,693,985 | 9/1972 | Dillner | 277/29 |
| 3,703,296 | 11/1972 | Malmstrom | 277/67 |
| 4,094,512 | 6/1978 | Back | 277/27 |
| 4,186,929 | 2/1980 | Burton et al. | 277/27 |
| 4,311,315 | 1/1982 | Kronenberg | 277/95 |
| 4,437,673 | 3/1984 | Miyamoto | 277/65 |
| 4,580,789 | 4/1986 | Jett | 277/65 |
| 4,832,511 | 5/1989 | Nisley et al. | 277/95 |

Primary Examiner—Allan N. Shoap
Assistant Examiner—Daniel G. DePumpo
Attorney, Agent, or Firm—Menotti J. Lombardi

[57] ABSTRACT

Tandem mounted face seals for use in centrifugal pumps with dynamic seals. One face seal has a flexible lip and the other face seal has a non-flexible lip to ensure sealing at high static or dynamic pressures.

14 Claims, 1 Drawing Sheet

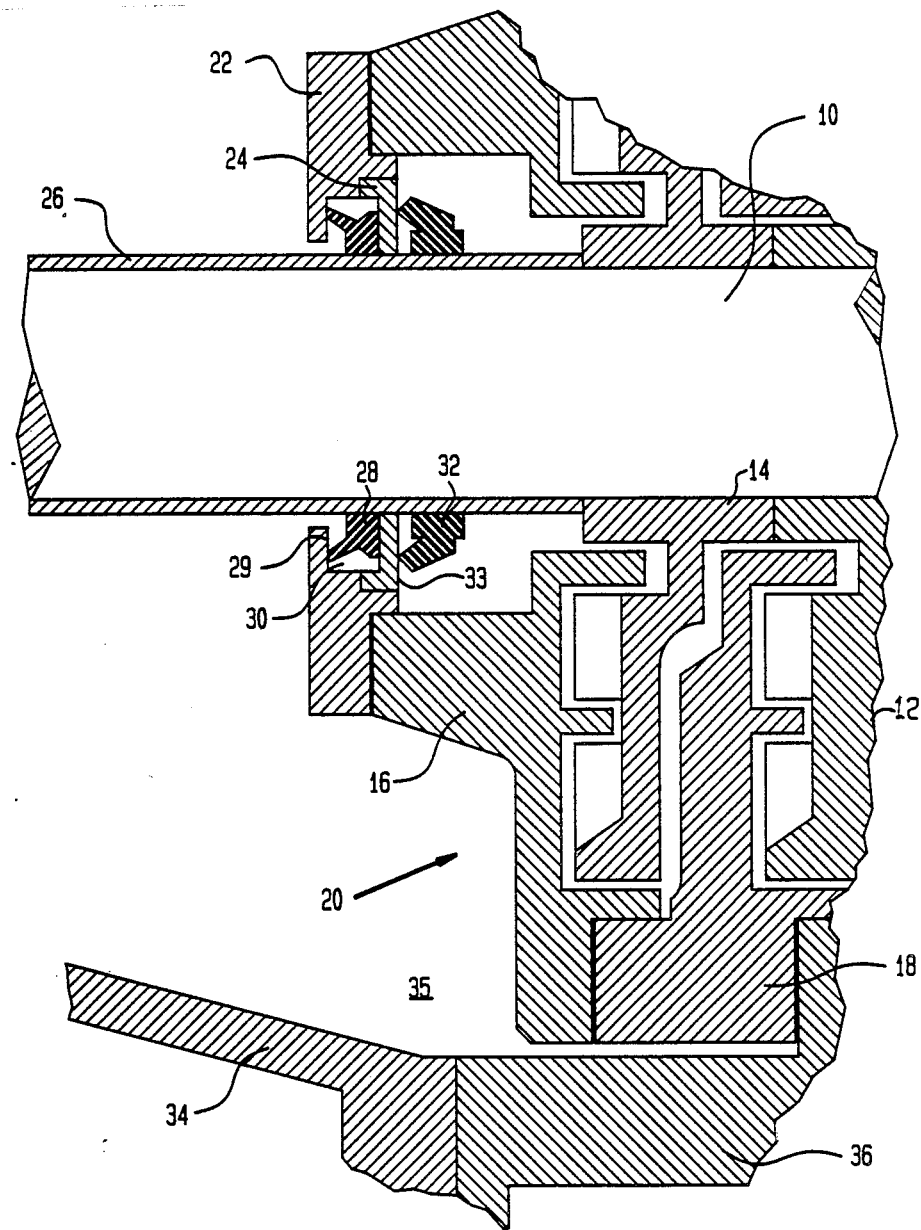

TANDEM MOUNTED FACE SEALS

BACKGROUND OF THE INVENTION

The invention relates to pump seals, and more particularly to a static seal arrangement for centrifugal pumps with dynamic seal arrangements.

Arrangements of flexible face seals are known from U.S. Pat. Nos. 3,713,659; 3,504,917; 4,311,315; and 3,016,251. These seal arrangements are designed to seal at relatively low pressures, so that at pressures higher than 20 psi, the flexible lip is easily damaged with resultant leakage.

U.S. Pat. No. 4,186,929 shows another type arrangement with a conventional lip seal, a non-flexible washer, and a flexible member. The conventional lip seal requires lubrication, and the flexible members run with a relatively big axial gap. At static conditions, the axial gap will get packed with contaminants. When pressure occurs, it forces contaminants into the lip seal area. In addition, the flexible member does not perform effectively because of the axial gap.

Other seal arrangements showing the state of the art are U.S. Pat. Nos. 623,127; 3,284,145; 3,588,129; and 4,509,773. Various face seal arrangements of the prior art are shown in U.S. Pat. Nos. 3,207,521; 3,771,799; 4,186,929; 2,368,137; 2,990,220; 3,612,547; and 3,727,923.

The tandem mounted face seals are an advance over the prior art arrangements represented above, and provide a novel solution to overcome severe application problems where high static or dynamic pressure occurs.

SUMMARY OF THE INVENTION

It is an object of the invention to provide an improved arrangement tandem mounted face seals for pumps.

Another object of the invention is to provide tandem mounted pump face seals, with one seal flexible and another seal less or non-flexible.

According to the broader aspects of the invention, the face seal with the flexible lip performs the primary sealing function and the face seal with the non-flexible lip functions as a deflector during rotation of the pump impeller to prevent leakage at the flexible lip when high static or dynamic pressures occur.

A feature of the invention is that the tandem mounted face seals are mounted between the dynamic seal arrangement and the frame of a centrifugal pump.

BRIEF DESCRIPTION OF THE DRAWING

Other features and objects of the invention will become apparent by reference to the following description taken in conjunction with the accompanying drawing which illustrates the tandem seal arrangement of the invention.

DETAILED DESCRIPTION OF THE PREFERRED EMBODIMENT

In the drawing, an impeller shaft 10 has mounted thereon a first stage expeller 12 and a second stage expeller 14 which coact with end plate 16 and inner plate 18 to form in a known manner a two stage dynamic seal 20. Gland 22 is fastened to end plate 16 and may be fabricated from steel, bronze, or brass material. Gland 22 includes a gland insert 24 which may be of similar material. Gland 22 and gland insert 24 are spaced from shaft sleeve 26 to permit passage of the shaft through the central opening.

A flexible lip face seal 28 is press mounted on shaft sleeve 26 within gland chamber 30 formed by the gland 22 and insert 24. A non-flexible lip face seal 32 is also press mounted on shaft sleeve 26. The lip of seal 28 is positioned to press firmly against counter face 29, and the lip of seal 32 is positioned to press firmly against counter face 33.

One type of seal suitable to perform the function of the flexible tip face seal is a Forsheda V-ring seal (Forsheda Shaft Seal Corporation, Cleveland, Ohio) made from a rubber grade material, for example, Nitrile, Neopren, Vitron. One type of seal suitable to perform the function of the non-flexible tip face seal is a Checkseal (Greene, Tweed & Co., Northwales, Pa.), made from, for example, a polymer material such as a carboxylated nitrile, fluroelastomer, or ethylene propylene depending on the service conditions.

Pump frame portion 34 forms part of the dynamic seal cavity 35, and dynamic seal stuffing box portion 36 is positioned between the impeller housing (not shown) and the frame 34. Dynamic seal stuffing box portion 36 is connected to the pump housing as are plates 16, 18.

In operation the face seal 28 with the flexible lip performs the primary sealing function. The flexible lip face seal seals at low static pressures from 0 to 5 psi. The non-flexible lip face seal functions as a flinger-deflecter during rotation of the impeller to propel contamination away from seal 28 and to protect seal 28 from high pressures at least up to 30 psi. If high pressure occurs and seal 28 starts to leak, the differential pressure created between the two seals 28, 32 will force seal 32 against the counter face 33 to prevent leakage.

The foregoing described a unique tandem seal arrangement, one flexible and another non-flexible seal. Material of the non-flexible seal is selected depending on the maximum static pressure which can occur during the pumping operation. The flexible seal is installed in the box like enclosure of the gland, and the non-flexible is run against the outside surface of the box like enclosure. Both of the face seals are self-adjusting, shaft mounted and used to deflect and exclude contaminants such as dust, dirt, mud and water migrating from the impeller housing to the stuffing box. Both seals are easily mounted on and rotate with the impeller shaft. The seals self-adjust after several rotations of the impeller shaft. It will be readily understood by those skilled in the art that the tandem seal arrangement of the invention is most suitable for severe applications where high static or dynamic pressure occurs.

While I have described the principles of my invention in connection with specific apparatus, it is to be clearly understood that this description is made only by way of example, and not as a limitation to the scope of the invention as set forth in the objects thereof and in the accompanying claims.

What is claimed is:

1. Sealing apparatus for use with a dynamic seal comprising:
    a rotatable shaft and said dynamic seal;
    a first seal member having a flexible lip mounted on said shaft;
    a fixed gland having a central opening and a gland chamber, said shaft passing through said central opening with clearance, and said first seal member being contained within said chamber and said flexible lip pressing against an interior wall of said chamber;

a second seal member having a non-flexible lip mounted on said shaft and axially spaced from said first seal member;

said non-flexible lip pressing against a wall of said chamber separating said first and second seal members whereby said second seal member functions as a deflector to propel contaminants away from said first seal member and prevent leakage from said first seal member at high pressures; and said dynamic seal being positioned adjacent said second seal and distal from said first seal.

2. The apparatus of claim 1 wherein said gland includes an L-shaped ring member insert forming a portion of said chamber.

3. The apparatus of claim 1 wherein said first seal member effectively seals at static pressures from zero to 5 psi.

4. The apparatus of claim 3 wherein said first seal member is a rubber type material.

5. The apparatus of claim 1 wherein said second seal member is made of a polymer type material.

6. The apparatus of claim 1 wherein if said first seal starts to leak at high pressure, the differential pressure between the area of said chamber and the area of said second seal will force said second seal against the outside wall face of said chamber and prevent leakage in the direction away from said dynamic seal.

7. The apparatus of claim 6 including a sleeve member on said shaft for mounting said first seal and second seal, and said sleeve abutting a rotational member of said dynamic seal means.

8. The apparatus of claim 3 wherein said second seal effectively prevents leakage at pressures greater than 20 psi.

9. In a pump having a dynamic seal, sealing apparatus comprising:

a rotatable shaft and said dynamic seal;

a first seal member having a flexible lip mounted on said shaft;

a fixed gland having central opening and a box like chamber, said shaft passing through said central opening with clearance, and said first seal member being contained within said chamber and said flexible lip pressing against an interior wall of said box like chamber;

a second seal member having a non-flexible lip mounted on said shaft and axially spaced from said first seal member;

said non-flexible lip pressing against a wall of said box like chamber separating said first and second seal members, whereby said second seal member functions as a flinger-deflector to propel contaminants away from said first seal member and prevent leakage from said first seal member at high pressures; and said dynamic seal positioned adjacent said second seal member and distal from said first seal member.

10. The apparatus of claim 9 wherein said first seal member effectively seals at static pressures from zero to 5 psi.

11. The apparatus of claim 10 wherein said first seal member is a rubber type material.

12. The apparatus of claim 13 wherein said second seal member is made of a polymer type material and is effective for sealing at least up to 30 psi.

13. The apparatus of claim 12 wherein if said first seal starts to leak at high pressure, the differential pressure between the area of said chamber and the area of said second seal will force said second seal against the outside wall face of said chamber and prevent leakage in the direction away from said dynamic seal.

14. Sealing apparatus comprising in combination:

a shaft rotatably mounted;

a flexible lip seal member press mounted on said shaft;

a fixed gland having a central opening and a box like chamber, formed therein, said shaft passing through said central opening with clearance, and said flexible lip seal member being contained within said chamber and said flexible lip pressing against an interior wall of said chamber;

a non-flexible lip seal member press mounted on said shaft and axially spaced from said flexible lip seal member;

said non-flexible lip seal member pressing against a wall of said chamber separating said first and second seal members, whereby said non-flexible lip seal member functions as a deflector to propel contaminants away from said flexible lip seal member to prevent leakage at high pressures;

dynamic seal means positioned adjacent the said of said non-flexible lip seal member;

said flexible lip seal member is made of a rubber type material and effectively seals at pressures from zero to 5 psi; and said non-flexible lip seal member is made of a polymer type material and is effective for sealing at least up to pressures of 30 psi.

* * * * *